United States Patent [19]

Okura et al.

[11] Patent Number: 5,360,624
[45] Date of Patent: Nov. 1, 1994

[54] EMULSION-TYPE FOOD

[75] Inventors: Yuji Okura, Yokohama; Toshio Tawada, Minoo; Yukihiro Nakao, Tondabayashi, all of Japan

[73] Assignee: Takeda Chemical Industries, Ltd., Japan

[21] Appl. No.: 902,239

[22] Filed: Jun. 23, 1992

[30] Foreign Application Priority Data

Jun. 24, 1991 [JP] Japan ................... 3-151791

[51] Int. Cl.$^5$ .............................................. A23L 1/054
[52] U.S. Cl. .................................... 426/573; 426/603; 426/605; 426/613; 426/589; 426/570; 426/804
[58] Field of Search ............... 426/573, 574, 575, 658, 426/804, 570, 589, 603, 613, 605

[56] References Cited

U.S. PATENT DOCUMENTS 3,754,925  8/1973  Kimura et al. ..................... 426/573
3,908,027  9/1975  Kimura et al. ..................... 426/573
4,844,922  7/1989  Uemura ........................... 426/574
5,153,020  10/1992  Singer et al. ...................... 426/572

FOREIGN PATENT DOCUMENTS 0367391  5/1990  European Pat. Off. .
2268657  2/1990  Japan .

OTHER PUBLICATIONS

Patent Abstracts of Japan, vol. 15, No. 388 (C-872) (Oct. 2, 1991).

Primary Examiner—Jeanette Hunter
Attorney, Agent, or Firm—Wegner, Cantor, Mueller & Player

[57] ABSTRACT

Emulsion-type food in which a part or all of the fat components are substituted by a pulverized curdlan gel is disclosed. The food is low-calorie and has desired appearance, mouthfeel and taste.

9 Claims, No Drawings

EMULSION-TYPE FOOD

FIELD OF THE INVENTION

The present invention relates to emulsion-type food utilizing curdlan.

BACKGROUND OF THE INVENTION

In general, emulsion-type food contains a relatively large amount of fat components.

Recently, the consuming public have paid more and more attention to limitation of fat intake with a rise in their intention of promoting health. Then, a lot of low fat diets have been developed. As a substitute for fat components, for example, a low fat food with decreased amounts of animal fat or other types of fat containing a hot-melt type gel dispersed in the food tissue (U.S. Pat. No. 4,844,922), and foods used as substitute for fats and oils, containing water soluble proteins, polysaccharide from marine plants, acidic food materials and water (JP-A 2-268657) have been reported.

However, fat components largely contribute to taste of food and, when fat components are simply reduced, there is a problem that not only taste such as flavor and smell but also quality in structural aspects of food such as texture or appearance are deteriorated. Therefore, substitutes for fat components have been developed extensively too substitute for the functions of fat components. In particular, many studies have been made on substitutes having the same texture as that of fat components.

OBJECTS OF THE INVENTION

The main object of the present invention is to provide a fat component substitute suitable for emulsion-type food.

This object as well as other objects and advantages of the present invention will become apparent to those skilled in the art from the following description.

SUMMARY OF THE INVENTION

The present inventors have intensively studied to solve the above problem. As a result, it has been found that to use a curdlan gel as a substitute for fats is effective. Thus, the present invention has been completed.

That is, according to the present invention, there is provided emulsion-type food in which a part or all of fat components are substituted with a curdlan gel.

DETAILED DESCRIPTION OF THE INVENTION

Curdlan used in the present invention is known as a generic name of thermo-coagulable polysaccharides mainly joined by $\beta$-1,3-glycosidic linkages. Examples thereof include polysaccharides produced by bacteria belonging to the genus Alcaligenes or the genus Agrobacterium. Specifically, there can be used, for example, polysaccharides produced by *Alcaligenes faecalis* var. myxogenes 10C3K [Agricultural Biological Chemistry, Vol. 130, pp. 196 (1966)], polysaccharides produced by mutant NTK-u (IFO 13140) of *Alcaligenes faecalis* var. myxogenes 10C3K (JP-B 48-32673), polysaccharides produced by *Agrobacterium radiobacter* (IFO 13127) and its mutant u-19 (IFO 13126) (JP-B 48-32674) and the like.

In the present invention, a gel of the above curdlan is utilized. The gel is formed by, for example, gelation of an aqueous solution or dispersion liquid of curdlan and may be either a thermo-reversible gel or a thermo-irreversible gel. Both gels can be used alone or in combination thereof depending upon a particular use and the desired effect.

The term "thermo-reversible gel" used herein means a gel which changes its state in such a manner that it melts at 50° to 80° C. and gels at 40° C. or lower and this change of state occurs reversibly. The thermo-reversible gel is prepared, for example, according to one of the following methods:

(1) Water is added to curdlan powder, followed by homogenizing with a high speed mixer such as a homogenizer, or a cutter mixer to obtain a uniform suspension. The suspension is heated to about 55° to 80° C., preferably about 60° to 750° C. and then cooled to below 40° C.;

(2) Curdlan powder is mixed with hot water at about 55° to 80° C., preferably about 60° to 75° C., and dispersed, followed by cooling to below about 40° C.; and (3) A dispersion liquid of curdlan powder in water is made strongly alkaline of about pH 10.5 or higher to dissolve curdlan. An acid is added to the solution to adjust it to about pH 5 to 9 to precipitate and coagulate curdlan.

The heat reversible gel obtained according to any method of the above method (1), (2) or (3) can be utilized in the present invention. The method of (1) or (2) is preferable.

The concentration of curdlan in the thermo-reversible gel is normally about 0.6 to 10% by weight, preferably about 1 to 5% by weight. About 3 to 5% by weight is more preferable.

The thermo-irreversible gel is a gel which does not melt by normal heating such as boiling for a long period of time, retorting and the like and whose properties are not changed at all upon cooling. The thermo-irreversible gel can be prepared, for example, according to one of the following methods:

(4) Water is added to curdlan powder, followed by homogenizing with a high speed mixer such as a homogenizer, a cutter mixer or the like to obtain a uniform suspension. The liquid is heated to 80° C. or higher; and (5) The thermo-reversible gel obtained by one of the above methods (1) to (3) is heated to 80° C. or higher.

The thermo-irreversible gel obtained by any method of the above (4) or (5) can be utilized in the present invention. For convenience sake, the method of (4) is preferred.

The concentration of curdlan in the thermo-irreversible gel is normally about 0.6 to 10% by weight, preferably about 1 to 5% by weight. About 3 to 5% by weight is more preferable.

The curdlan gel thus prepared is pulverized into finely divided particles. The pulverization can be carried out by applying shear force or pressure manually with a knife, a kitchen knife or the like, or mechanically with a silent cutter, a mixer or the like. For example, a method wherein a gel is pulverized into finely divided particles using a mixer having a high speed rotary knife, or a method wherein a gel is crushed into smaller pieces with a mixer or the like and then they are further broken into finely divided particles with a piston-type homogenizer or the like. The method wherein a gel is pulverized into finely divided particles using a mixer having a high speed rotary knife is preferable. However, the pulverization is not limited to any specific method. As the mixer having a high speed rotary knife, there can be used, for example, a cutter mixer, a food cutter, a line mixer, a household mixer and the like. A cutter mixer or household mixer is preferable.

Depending upon a particular apparatus to be used, the gelation and the pulverization can be carried out simultaneously in one step by applying shear force, pressure or the like mechanically during heat gelation.

The pulverization of the thermo-reversible gel is preferably carried out at temperatures of about 40° C. or lower in order to maintain the good heat coagulation property of curdlan or to avoid melting and re-coagulation of the gel.

The degree of the pulverization is not specifically limited and it depends upon a particular food in which the pulverized gel is used. Normally, such a pulverization degree that any rough mouthfeel is not recognized is preferable. For example, when the curdlan gel is used in food such as whipped cream whose smoothness is especially important, it is preferred to use the finely divided curdlan gel having smaller particle size. A useful example is, the finely divided curdlan gel having an average size of not larger than about 100 μm, preferably not larger than about 50 μm. It is preferred that the particle size is as fine as possible.

The pulverization curdlan gel thus prepared has the same mouthfeel as chat of fats or fat globes, namely, smoothness and body. Normally, the finely divided curdlan gel as it is can be used for substitution for a part or all of fat components in food. The amount of the curdlan gel to be used in food is not specifically limited and can be determined according to the kind of a particular food and the desired properties and characteristics thereof such as viscosity, consistency, smoothness, etc. For practical purposes, in general, it is preferred that at least 20% by weight of fat components to be formulated in the case of conventional non low-calorie or regular food is substituted with the curdlan gel. Although the amount of curdlan in food is not specifically limited, in view of the viscosity or consistency of food, it is preferred that the amount of curdlan is about 0.5 to 3% by weight based on the total amount of the food. About 1.0 to 2.5% by weight is preferable. Where higher viscosity or consistency is desired, the amount of curdlan is increased.

In so far as gelation and pulverization of the curdlan gel are not significantly disturbed, other raw materials of food can be added before the above gelation or pulverization step. The other raw materials of food are not specifically limited, and examples thereof include gum, for example, extraction from marine plants (e.g., agar, carrageenan, salt of alginic acid, furcellaran, etc.), seed polysaccharide (e.g., locust been gum, guar gum, tamarind gum, tara gum, etc.), polysaccharide from a microorganism (e.g., xanthan gum, pullulan, sodium poly glutamic acid, etc.), plant stickness (e.g., pectin, konjak-mannan, arabic gum, karaya gum, arabinogalactan, gum ghatti, etc.) or animal protein (e.g., gelatin, etc.), gelling agents (e.g., agar, carrageenan, gelatin, etc.), starch (e.g., waxy corn starch, potato starch, α-starch, starch degradation products, etc.), saccharides (e.g., dextrin, thick starch syrup, oligosaccharides, etc.), proteinous materials and their degradation products (e.g., egg white, soybean protein, etc.), seasonings (e.g., sugar, salt, vinegar, wine, sodium glutamate, pepper, mustard, etc.), egg yolk, skimmed milk powder, flavors (e.g., cream flavor, etc.), coloring agents (e.g., β-carotene, chlorophyll, etc.) and the like. Further, raw materials of food such as strained vegetables, fruits or the like or their juice can be added. The amount of these materials to be added is not specifically limited and, preferably, they are used in such amounts that sufficient swelling of curdlan is not disturbed when they are added before the gelation step of curdlan. For example, the amount of the raw materials is about 20 to 90% by weight of the total weight of the mayonnaise, and it is about 20 to 95% by weight of the total weight of the whipped steam or dressing-type seasoning.

The emulsion-type food of the present invention is that containing the above curdlan gel as a substitute for fat components. As described above, the amount of the curdlan gel to be used is preferably at least 20% by weight of fat components in the conventional, regular or standard formulation of the corresponding conventional or regular emulsion-type food. For example, normally, it is considered that conventional mayonnaise contains about 70% by weight of fat and oil components. Then, according to the present invention, preferably, at least about 14% by weight of the curdlan gel is used instead of the fat and oil components to obtain the desired low-calorie mayonnaise.

Examples of the emulsion-type food of the present invention include spreads e.g., butter, margarine, etc.), mayonnaise, dressings, desserts (e.g., whipped cream, sour cream, ice cream, Bavarian, etc.), cheeses, dairy products, confectioneries using butter, cream or the like, white sauces and the like.

In the present invention, a method for addition of the curdlan gel to food and the kind of the gel can be appropriately chosen by taking into consideration of a particular purpose of addition (whether gelation is necessary or not), production process of food (presence or absence of heating step, heating temperature), workability and the like. For example, in order to produce mayonnaise, there can be employed a method wherein egg yolk, gum, starch, skimmed milk powder, saccharides, proteinous materials degradation products and seasonings are added to the finely divided thermo-reversible or thermo-irreversible gel obtained by the method, vinegar is added to the resulting mixture, and to produce whipped cream, there can be employed a method wherein gum, skimmed milk powder, a whipping agent, a cream flavor, a coloring agent and sugar are added to the finely divided thermo-irreversible gel obtained by the above method and then the resulting mixture is further pulverized.

The whipping agent to be used herein is not specifically limited so long as it has whipping capability. In general, an emulsifying agent having whipping capability alone or in combination with another emulsifying agent are preferably used. As examples of the emulsifying agent, there can be used sucrose fatty acid esters, monoglycerin fatty acid esters, sorbitan fatty acid esters, propylene glycol fatty acid esters, lecithins, proteins and their hydrolyzates (e.g., egg white, soybean protein, etc.), saponins and the like. The emulsifying agent acts as not only a frother. It influences on stability of bubbles as well as viscosity and hardness of the entire cream. Therefore, several emulsifying agents are preferably used in combination.

According to the present invention, there is provided low-calorie food having desired appearance and mouthfeel.

The following Examples further illustrate the present invention in detail but are not to be construed to limit the scope thereof.

In the Examples, a commercially available confectionary emulsifying frother preparation containing sucrose fatty acid esters, glycerin fatty acid esters, sorbitan fatty acid esters and the like was used.

Curdlan used in the Examples was a spray dried powder of a heat coagulable polysaccharide produced by the mutant NTK-u (IFO 13140) of *Alcaligenes faecalis* var. myxogenes 10C3K.

EXAMPLE 1

Mayonnaise

Hot water (2056.5 g) heated to 65° C. was placed in a cutter mixer (Model 12DV manufactured by Aikousha Seisakusho, Japan) equipped with a saw blade cutter knife and a jacket. When the temperature of hot water became 60° C., curdlan (manufactured by Takeda Chemical Industries, Ltd., Japan) (125 g) was added and mixed at 1,800 rpm for 3 to 5 seconds and then at 3,600 rpm for 1 minute. Ice (600 g) was added to the resulting aqueous suspension of curdlan. Cold water was circulated in the jacket of the cutter mixer and ice was melted and mixed with the suspension with agitating at 1,800 rpm for 1 minute. In this state, curdlan became small pieces of a thermo-reversible gel. Further, the resulting gel was pulverized at 3,600 rpm for 10 minutes, while maintaining the temperature at below 40° C. The finely divided reversible gel thus obtained had an average particle size of not larger than about 50 $\mu$m and was very smooth.

Xanthan gum (Orno X2 manufactured by Takeda Chemical industries, Ltd., Japan) (25 g) and starch degradation products (SR-25 sold by Takeda Chemical Industries, Ltd., Japan) (150 g) were added to the gel and the mixture was agitated at 3,600 rpm for 10 minutes, while maintaining the temperature at below 40° C. To the mixture were added egg yolk containing salt (10%) (800 g), skimmed milk powder (manufactured by Snow Brand Dairy Co., Ltd., Japan) (250 g), dextrin (150 g), refined sugar (manufactured by Taiyo Fishery Co., Ltd., Japan) (50 g), sodium glutamate (manufactured by Takeda Chemical Industries, Ltd., Japan) (10 g), refined salt (10 g), protein degradation product (5 g), mustard powder (15 g) and white pepper powder (3.5 g). The resulting mixture was mixed again at 3,600 rpm for 5 minutes. Further, high acidity apple vinegar (750 g) having acidity of 10% was added, mixed at 3,600 rpm for 5 minutes and deaerated by a vacuum pump to obtain mayonnaise containing no oil. The mayonnaise has almost the same appearance and taste as those of a conventional commercially available mayonnaise. When the mayonnaise of this Example was used in salad, its taste was as good as that of a conventional commercially available mayonnaise.

EXAMPLE 2

Whipped Cream

Curdlan (15 g) and carrageenan (Orno CW sold by Takeda Chemical Industries, Ltd., Japan) (2.5 g) were added to water (450 g) and dispersed homogeneously by mixing with a household mixer (Model VA-W 25, manufactured by Hitachi, Ltd., Japan) for 8 minutes. After deaerating, the dispersed material was filled into a casing tube and boiled in a water bath (100° C.) for 30 minutes to obtain a thermo-irreversible gel of curdlan. After the gel was cooled to room temperature, the gel was thoroughly pulverized with the household mixer for 8 minutes. To the pulverized gel was added successively skimmed milk powder (32.5 g), a whipping agent preparation (Ryoto ester SP, manufactured by Mitsubishi kasei Shokuhin, Japan) (5 g), a cream flavor (manufactured by Ogawa & Co., Japan) (0.5 g), a coloring agent (cold water-soluble powder containing $\beta$-carotene (1%) manufactured by Japan Rosche, Japan) (0.02 g) and refined sugar (170 g) while pulverization was continued with the household mixer for 8 minutes to obtain a homogeneous stock cream. The finely divided particles of the curdlan gel in the stock cream had average particle size of not larger than 50 $\mu$m. The stock cream had freezing resistance and can be stored by freezing for a long period of time unlike fresh cream.

The stock cream was thoroughly whipped by a mixer (Model Kenmix Shelf KM-201 manufactured by Aikousha Seisakusho, Japan) equipped with a whipper to obtain smooth and good whipped cream, which had relatively high overrun and was suitable for decoration of cake and toppings of dessert as whipped cream prepared from fresh cream did. Further, the whipped cream thus obtained had better shape retention, especially heat resistance than that of whipped cream prepared from fresh cream, and retained its shape fully even after in was allowed to stand for a long period of time at room temperature.

Furthermore, when the above cream containing no fats was cooled to about 5° C. and then mixed with 5 to 30 parts by weight of a conventional commercially available fresh cream per 100 parts by weight of the cream containing no fats, a low fat cream was readily prepared.

EXAMPLE 3

Dressing Type Seasoning

Curdlan (12 g) was added to water (288 g) and the mixture was uniformly dispersed by mixing with a household mixer (Model VA-W-25 manufactured by Hitachi Ltd., Japan) for 8 minutes. After deaerating, the suspension was placed in a tray of 3 cm in thickness and steamed for 30 minutes to obtain the heat irreversible curdlan gel. Then, the gel was thoroughly pulverized with the household mixer for 8 minutes and to the resulting finely divided gel were added water (391 g), refined sugar (120 g), egg yolk (60 g), salt (25 g), white wine (10 g), sodium glutamate (4 g), Umamix (flavor sold by Takeda Chemical Industries, Ltd., Japan), tomato ketchup (6 g), spices (1 g), $\alpha$-starch powder (30 g), brewed vinegar (24 g) and citrus juice (20 g). The mixture was mixed with the household mixer for 8 minutes and deaerated to obtain a dressing type seasoning.

The dressing type seasoning thus obtained had desired gloss and texture, thick mouthfeel and good taste.

What is claimed is:

1. A process for producing a food product having curdlan gel as a fat substitute, comprising:
   a) preparing a curdlan gel that is convertible from its gel state to a liquid state when heated to a temperature above 40° C., the curdlan gel containing 0.6 to 10% by weight of curdlan; then
   b) pulverizing the curdlan gel into particles less than 100 $\mu$m in diameter at a temperature less than about 40° C. to limit melting and re-coagulation of the curdlan gel; and then
   c) combining the curdlan gel with other food ingredients at temperatures of less than about 40° C. to obtain the food product as an emulsion, the curdlan gel being 0.5% to 3% by weight of the food product and at least 20% by weight of the total amount of fat or fat substitutes in the food product.

2. A food product produced by the process of claim 1 selected from the group consisting of mayonnaise, whipped cream, and seasoned dressing.

3. A process for producing a food product having curdlan gel as a fat substitute, comprising:
   a) preparing a curdlan gel that is nonconvertible from its gel state to a liquid state when heated in water to 100° C., the curdlan gel containing 0.6 to 10% by weight of curdlan; then
   b) pulverizing the curdlan gel into particles less than 100 μm in diameter; and then
   c) combining the curdlan gel with other food ingredients to obtain the food product as an emulsion, the curdlan gel being 0.5% to 3% by weight of the food product and at least 20% by weight of the total amount of fat or fat substitutes in the food product.

4. A food product produced by the process of claim 3 selected from the group consisting of mayonnaise, whipped cream, and seasoned dressing.

5. A process for producing a food product having curdlan gel as a fat substitute, comprising:
   a) preparing a curdlan gel that contains 0.6 to 10% by weight of curdlan;
   b) pulverizing the curdlan gel into particles less than 100 μm in diameter; and
   c) combining the curdlan gel with other food ingredients to obtain the food product as an emulsion, the curdlan gel being 0.5% to 3% by weight of the food product and at least 20% by weight of the total amount of fat or fat substitutes in the food product.

6. The process of claim 5, wherein the steps of preparing the food product are carried out sequentially from (a) to (c).

7. The process of claim 5, wherein the steps of (a) preparing the curdlan gel and (b) pulverizing the curdlan gel are carried out simultaneously.

8. The process of claim 5, wherein the step of (c) combining the curdlan gel with other food ingredients is carried out prior to the step of (b) pulverizing the curdlan gel.

9. The process of claim 5, wherein the step of (a) preparing the curdlan gel involves preparing the gel from a mixture of curdlan and at least one other food ingredient.

* * * * *